(12) United States Patent
Hayakashi (10) Patent No.: US 6,715,049 B1
(45) Date of Patent: Mar. 30, 2004

(54) MICROCOMPUTER AND INFORMATION PROCESSING SYSTEM

(75) Inventor: Yoshiki Hayakashi, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/162,999

(22) Filed: Sep. 30, 1998

(30) Foreign Application Priority Data

Oct. 1, 1997 (JP) ............................................ P9-268838

(51) Int. Cl.[7] .............................................. G06F 12/14
(52) U.S. Cl. ........................ 711/163; 710/107; 710/108; 710/110; 711/147; 711/148; 711/149; 711/152; 711/156; 711/164
(58) Field of Search ................................ 710/107, 108, 710/110; 711/147, 148, 149, 152, 156, 163, 164

(56) References Cited

U.S. PATENT DOCUMENTS

| | | | | |
|---|---|---|---|---|
| 5,581,507 A | * | 12/1996 | Scherpenberg et al. | 365/189.09 |
| 5,901,328 A | * | 5/1999 | Ooe | 710/5 |
| 5,914,543 A | * | 6/1999 | Scherpenberg et al. | 307/126 |
| 6,032,237 A | * | 2/2000 | Inoue et al. | 365/195 |
| 6,138,240 A | * | 10/2000 | Tran et al. | 713/202 |
| 6,202,154 B1 | * | 3/2001 | Suzuki et al. | 711/163 |

* cited by examiner

Primary Examiner—T. Nguyen
(74) Attorney, Agent, or Firm—Oblon, Spivak, McClelland, Maier & Neustadt, P.C.

(57) ABSTRACT

A microcomputer and an information processing system protect data stored therein and secure the safety of the data. The microcomputer (1) has a memory (3), a read protect register (13), and a write protect register (14). The protect registers store addresses that represent protected areas in the memory where an access from the outside is prohibited. If an access from the outside involves an address of the protected areas, the access to the memory is disabled.

15 Claims, 5 Drawing Sheets

MICROCOMPUTER AND INFORMATION PROCESSING SYSTEM

BACKGROUND OF THE INVENTION

1. Field of the Invention

The present invention relates to a microcomputer and an information processing system having a memory whose data is protected from an access from the outside.

2. Description of the Prior Art

Figure 1:
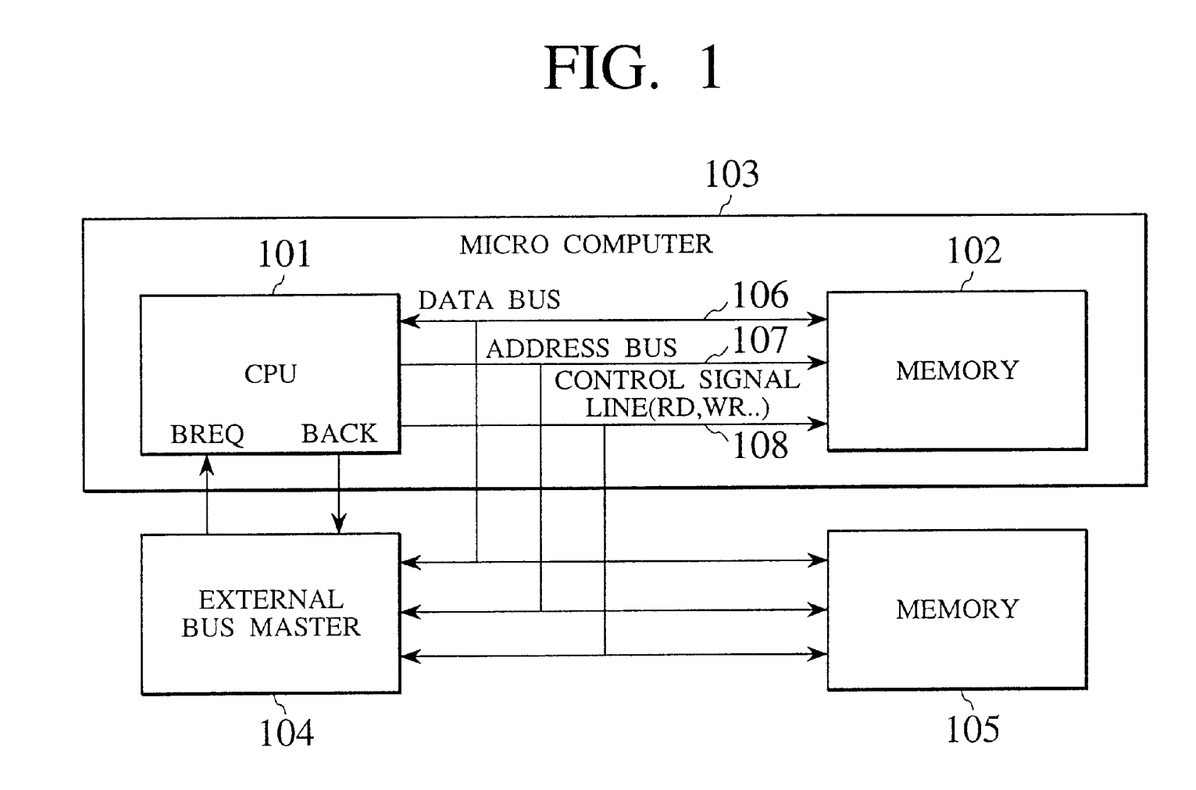
FIG. 1 shows a microcomputer and an information processing system according to a prior art.

A CPU-controlled system has busses to which a CPU (central processing unit), a bus master unit, a memory, a peripheral unit, etc., are connected. Recent processing technology frequently packages a CPU and a memory into a single chip to form a microcomputer. FIG. 1 shows an example of such a CPU-controlled system. The system includes a microcomputer 103 composed of a CPU 101 and a memory 102, an external bus master unit 104, an external memory 105 or a peripheral unit. These elements are connected to one another through a data bus 106, an address bus 107, and a control signal line 108. The CPU 101 or the bus master unit 104 acquires a bus right to drive the buses and signal line.

The external bus master unit 104 will not be allowed to access a specific area in the memory 102 where a program is stored, and is allowed to access an area in the memory 102 where data is stored.

Figure 2:
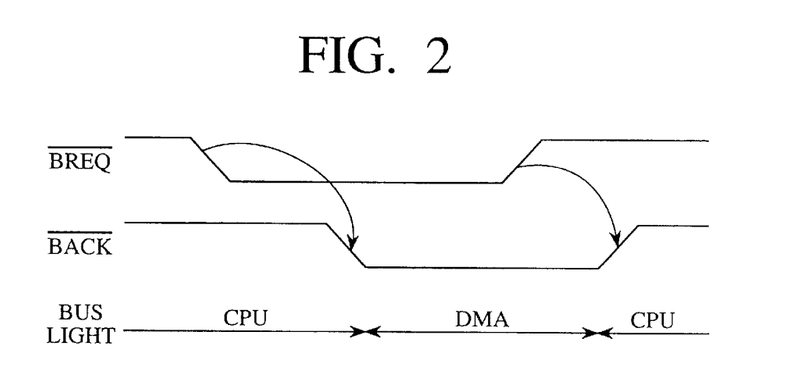
FIG. 2 is a timing chart showing the operation of the system of FIG. 1.

FIG. 2 is a timing chart showing a sequence of acquiring the bus right. The bus right acquisition is realized through a handshake using a bus right request signal/BREQ and a bus right authorization signal/BACK. The bus right is controlled by the CPU 101. When the external bus master unit 104 needs the bus right, it asserts the signal/BREQ. If the CPU 101 is ready to transfer the bus right, it asserts the signal/BACK. Upon receiving the asserted signal/BACK, the bus master unit 104 acquires the bus right and drives the buses. If the bus right becomes not needed, the bus master unit 104 negates the signal/BREQ. In response to this, the CPU 101 negates the signal/BACK and acquires the bus right. In this way, the memory 102 in the microcomputer 103 is easy to access from the outside.

Figure 3:
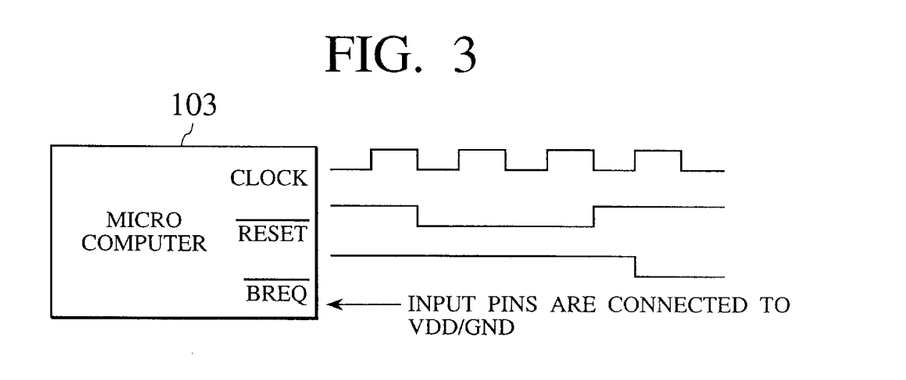
FIG. 3 explains a technique of accessing a memory incorporated in the microcomputer of FIG. 1.

To secure the safety of data in the memory 102, it is necessary to restrict read and write accesses from the outside to the memory 102. Accessing the memory 102 from the outside, however, is very easy. FIG. 3 explains a simple way of accessing the memory 102 from the outside. An operation clock signal CLOCK is supplied to the microcomputer 103. At proper timing, a reset signal/RESET is asserted and negated, and the bus right request signal/BREQ is asserted. Then, the memory 102 becomes accessible from the outside.

In this way, an external bus master unit can easily access a memory incorporated in a microcomputer only by acquiring a bus right of address and data buses connected to a CPU of the microcomputer. Then, the external bus master unit can easily read or write data from or to the memory. It is difficult to protect data in the memory from external accesses.

SUMMARY OF THE INVENTION

An object of the present invention is to provide a microcomputer and an information processing system capable of protecting data stored in a memory.

In order to accomplish the object, an aspect of the present invention provides a computer having a memory, a CPU, a register, and a control circuit. The memory is accessible from the outside. The CPU controls a bus right to authorize the use of address and data buses running between the CPU and the memory. The CPU receives a bus right request from the outside, and if the request is acceptable, provides the outside with the bus right. The register holds protected addresses that represent protected areas in the memory where an access from the outside is prohibited. The control circuit compares the protected addresses with a target address of a read or write access made from the outside to the memory after the bus right is given to the outside, and if the target address is within the protected addresses, disables the read or write access.

The protected areas in the memory may store programs and specific data.

Another aspect of the present invention provides a computer having a CPU, a memory accessible from the CPU and the outside, an address bus for transferring an address from one of the CPU and the outside to the memory, a data bus for transferring data between the memory and one of the CPU and the outside, a signal line for transferring a read control signal from one of the CPU and the outside to the memory when reading data from the memory, a signal line for transferring a write control signal from one of the CPU and the outside to the memory when writing data to the memory, an input/output buffer for controlling data input/output between the data bus and the outside in response to an output enable signal, an address decoder for enabling the memory upon receiving an address from the address bus, a gate for setting the memory to a write enabled state in response to the write control signal and a write enable signal, an output control circuit for generating the output enable signal and supplying it to the input/output buffer, and a write control circuit for generating the write enable signal and supplying it to the gate.

Still another aspect of the present invention provides a computer having a CPU, a memory accessible from the CPU and the outside, an address bus for transferring an address from one of the CPU and the outside to the memory, a data bus for transferring data between the memory and one of the CPU and the outside, a signal line for transferring a read control signal from one of the CPU and the outside to the memory when reading data from the memory, an input/output buffer for controlling data input/output between the data bus and the outside in response to an output enable signal, and an output control circuit for generating the output enable signal and supplying it to the input/output buffer.

The output control circuit has a read protect register.

The read protect register holds data for specifying read-protected areas in the memory where a read access from the outside is prohibited.

The output control circuit issues the output enable signal if the CPU has a bus right and uses it to carry out a write access to the memory, or if the outside has the bus right and uses it to carry out a read access to an address of the memory that is out of the read-protected areas.

The output control circuit has a comparator for determining whether or not an accessed address is in the read-protected areas.

Still another aspect of the present invention provides a computer having a CPU, a memory accessible from the CPU and the outside, an address bus for transferring an address from one of the CPU and the outside to the memory, a data bus for transferring data between the memory and one of the CPU and the outside, a signal line for transferring a write control signal from one of the CPU and the outside to the memory when writing data to the memory, a gate for setting the memory to a write enabled state according to an AND of the write control signal and a write enable signal, and a write control circuit for generating the write enable signal and supplying it to the gate.

The write control circuit has a write protect register.

The write protect register holds data for specifying write-protected areas in the memory where a write access from the outside is prohibited.

The write control circuit issues the write enable signal if the outside has a bus right and uses it to carry out a write access to an address of the memory that is out of the write protected areas.

The write control circuit has a comparator for determining whether or not an accessed address is in the write-protected areas.

Still another aspect of the present invention provides an information processing system having a microcomputer and an external bus master unit. The microcomputer consists of a memory accessible from the outside, a CPU for controlling a bus right to authorize the use of address and data buses running between the CPU and the memory, the CPU receiving a bus right request from the outside, and if the request is acceptable, providing the outside with the bus right, a register for holding protected addresses that represent protected areas in the memory where an access from the outside is prohibited, and a control circuit for comparing the protected addresses with a target address of a read or write access made from the outside to the memory after the bus right is given to the outside, and if the target address is within the protected addresses, disabling the read or write access. The external bus master unit issues a bus right request to the CPU, receives a bus right authorization from the CPU if the request is accepted by the CPU, and accesses the memory through the address and data buses according to the bus right authorization.

The information processing system may have an external memory that is accessible from the CPU and external bus master unit.

The microcomputer is fabricated in a single chip, and the external bus master unit and external memory are fabricated in a single chip.

Still another aspect of the present invention provides a microcomputer having an address bus involving an external terminal, a data bus involving an external terminal, a control bus involving an external terminal, a bus right request signal line involving an external terminal, a bus right authorization signal line involving an external terminal, a CPU connected to the address bus, data bus, and control bus, for releasing a bus right after accepting a bus right request from the outside, a memory connected to the CPU through the address bus, data bus, and control bus, a write access to the memory being enabled in response to a write enable signal, a unit for storing data to specify a protected area in the memory where an access is prohibited, and a controller for monitoring an address in the address bus while a bus right authorization signal is active in the bus right authorization signal line, and prohibiting an access to the memory if the access is made to the protected area of the memory.

DETAILED DESCRIPTION OF THE EMBODIMENTS

The embodiments of the present invention will be explained with reference to the accompanying drawings.

Figure 4:
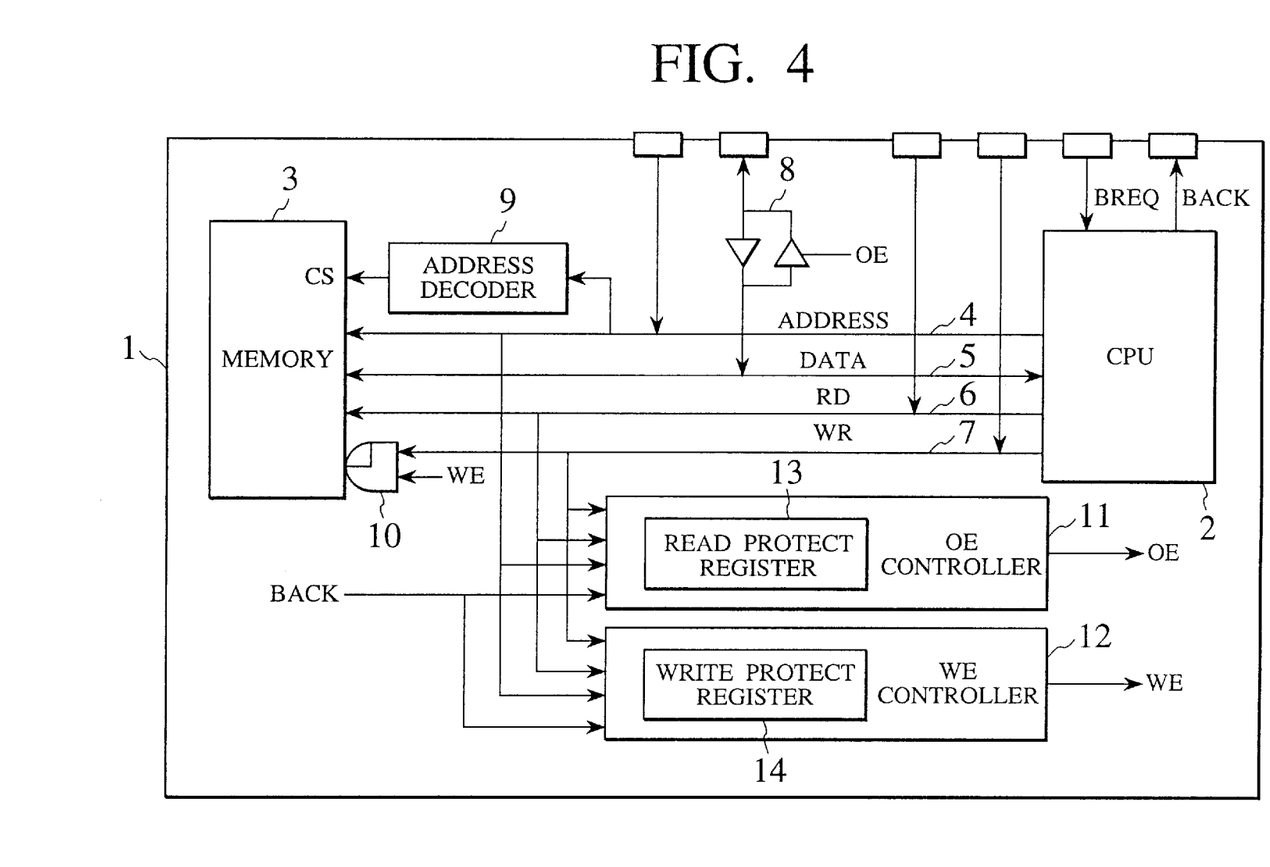
FIG. 4 shows a microcomputer according to an embodiment of the present invention.

FIG. 4 shows a microcomputer according to an embodiment of the present invention.

Elements of the microcomputer 1 will be explained one by one. A CPU 2 carries out various operations and serves as a control center. A memory 3 may be a flash memory, an SRAM, a DRAM, or an MROM and is accessible from the CPU 2 and from the outside. An address bus 4 transfers an address from the CPU 2 or the outside to the memory 3. A data bus 5 transfers data between the memory 3 and the CPU 2 or the outside. A read control signal line 6 transfers a read control signal RD from the CPU 2 or the outside to the memory 3 when reading data from the memory 3. A write control signal line 7 transfers a write control signal WR from the CPU 2 or the outside to the memory 3 when writing data to the memory 3. An I/O (input/output) buffer 8 controls data input/output between the data bus 5 and the outside. An address decoder 9 receives an address from the address bus 4 and enables the memory 3. An AND gate 10 puts the memory 3 into a write enabled state according to an AND of the write control signal and a write enable signal WE. An output enable signal controller 11 generates an output enable signal OE and supplies it to the I/O buffer 8 to control the data output of the I/O buffer 8. A write enable signal controller 12 generates the write enable signal WE and supplies it to the AND gate 10.

The CPU 2 can access every area in the memory 3 and controls a bus right to use the address bus 4 and data bus 5. The CPU 2 receives a bus right request signal BREQ from an external bus master unit (not shown), and if the request is acceptable, sends a bus right authorization signal BACK to the external bus master unit to transfer the bus right to the external bus master unit.

The elements mentioned above may be installed in an IC card such as a smart card, which has contact-type or non-contact-type terminals for passing signals including the bus right request and bus right authorization signals for the address bus, data bus, control bus, and signal lines.

The output enable signal controller 11 has a read protect register 13. The register 13 holds data to specify a read protected area in the memory 3 where a read access from the outside is prohibited. For example, the data specifies the start and end addresses of the protected area, or the start address and length of the protected area. The data in the register 13 is set by a boot program just after the microcomputer 1 is reset. The controller 11 receives the write control signal WR, read control signal RD, a read address from the address bus 4, and the bus right authorization signal BACK and asserts the output enable signal OE if the bus right is possessed by the CPU 2 to carry out a write access to the memory 3, or if the bus right is possessed by the external bus master unit to carry out a read access to the memory 3 with an address to read being out of the read-protected area.

Figure 5:
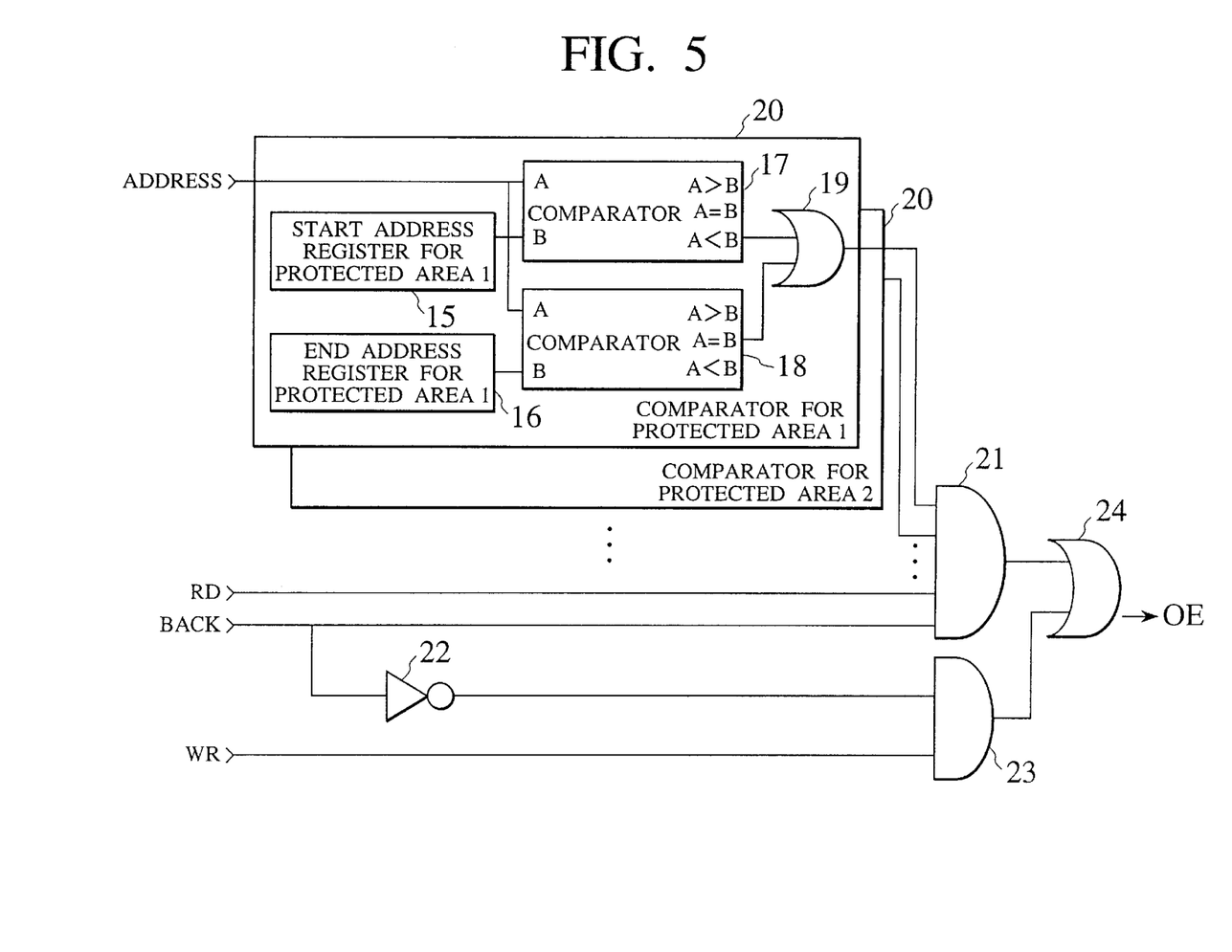
FIG. 5 shows an output enable signal controller of FIG. 4.

FIG. 5 shows an example of the output enable signal controller 11. The controller 11 has comparator circuits 20 each having registers 15 and 16, comparators 17 and 18, and an OR gate 19. The register 15 stores a start address of a read-protected area where a read access is prohibited. The register 16 stores an end address of the read-protected area. The comparator 17 compares a given address with the start address stored in the register 15 to see if the given address is smaller than the start address. The comparator 18 compares the given address with the end address stored in the register 16 to see if the given address is greater than the end address. The OR gate 19 provides an OR of the outputs of the comparators 17 and 18. An AND gate 21 receives the outputs of the comparator circuits 20, the read control signal RD, and the bus right authorization signal BACK. An AND gate 23 receives the output of an inverter 22 that inverts the bus right authorization signal BACK, and the write control signal WR. An OR gate 24 receives the outputs of the AND gates 21 and 23 and provides the output enable signal OE.

The write enable signal controller 12 has a write protect register 14. The write protect register 14 holds data to specify a write-protected area in the memory 3 where a write access from the outside is prohibited. For example, the data specifies the start and end addresses of the write-protected area, or the start address and length of the write-protected area. The data in the register 14 is set by a boot program just after the microcomputer 1 is reset. The controller 12 receives the write control signal WR, read control signal RD, an address from the address bus 4, and the bus right authorization signal BACK and asserts the write enable signal WE if the bus right is possessed by the external bus master unit to carry out a write access to the memory 3 with an address to write being out of the write-protected area. The controller 12 resembles the controller 11 of FIG. 5 except that the controller 12 does not have the inverter 22, AND gate 23, and OR gate 24, that the write control signal WR instead of the read control signal RD is supplied to the AND gate 21, and that the output of the AND gate 21 is the write enable signal WE.

If the external bus master unit acquires the bus right to access the memory 3, the comparator circuits 20 check an accessed address to see if it is in the protected areas of the memory 3. If it is in the protected areas, the output enable signal OE or the write enable signal WE is controlled to disable the access to the memory 3 from the external bus master unit. Namely, any illegal access (FIG. 3) to the memory 3 is disabled to protect data stored in the-memory 3.

It is possible to disable only a read or write access to the memory 3 by employing only one of the controllers 11 and 12. In response to an access to the protected areas in the memory 3, it is possible to put the data bus 5 in a floating state, or start an interrupt process to erase the accessed data from the memory 3. Any area in the memory 3 where a program or specific data that must be blocked from external access is stored can be set as a protected area. The whole of the memory 3 may be set as a protected area. The protected area stores, for example, an encryption key or a password for a card.

The microcomputer 1 and external bus master unit may constitute an information processing system. In this case, the external bus master unit issues a bus right request signal to the CPU 2, which issues a bus right authorization signal to the external bus master unit if the bus right request is acceptable. Upon receiving the bus right authorization signal, the external bus master unit accesses the memory 3 through the address bus 4 and data bus 5. The information processing system may have an external memory that is accessible from the CPU 2 and external bus master unit. The microcomputer 1 may be fabricated in a single chip, and the external bus master unit and external memory in another chip. Such an information processing system is flexibly applicable to a variety of uses.

Figure 6:
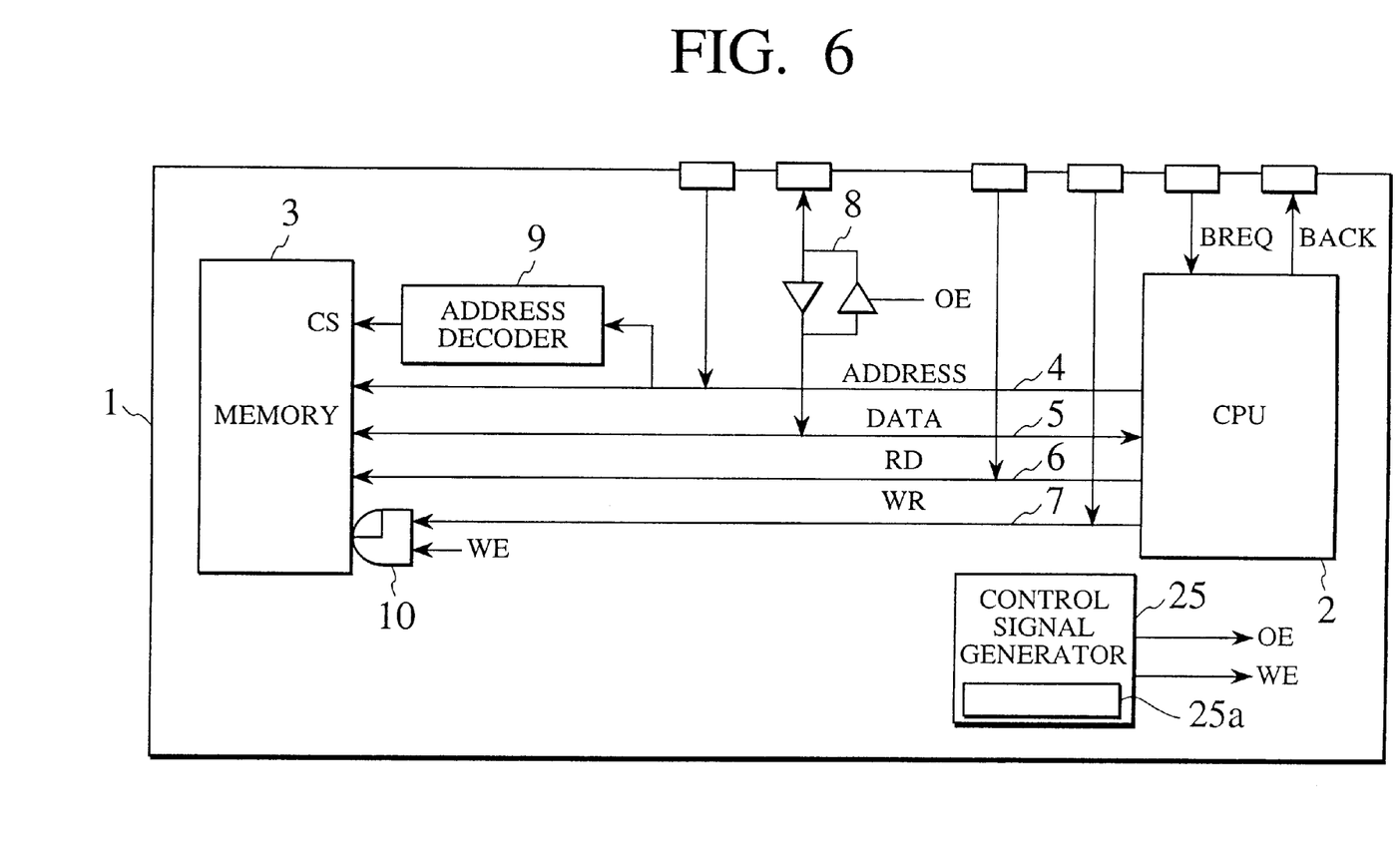
FIG. 6 shows a microcomputer according to another embodiment of the present invention.

FIG. 6 shows a microcomputer according to another embodiment of the present invention. This embodiment protects data stored in a memory not by setting a protected area in the memory but by restricting external accesses to the memory. The same parts as those of FIG. 4 are represented with like reference marks in FIG. 6, to omit their repetitive explanations.

A control signal generator 25 issues a write enable signal WE and an output enable signal OE. A CPU 2 issues I/O instructions to control the control signal generator 25 and transfers a bus right to an authorized access.

When the microcomputer 1 is reset, the CPU 2 executes a boot program for initialization. At this time, any direct access to the memory 3 from the outside is prohibited. Even if a bus right authorization signal BACK is issued for a bus right request signal BREQ, no access is enabled unless the control signal generator 25 issues the write enable signal WE or the output enable signal OE.

Any external unit that needs to directly access the memory 3 issues an access request instruction beforehand. In response to the instruction, the CPU 2 asks the external unit to enter a password. If the password is acceptable, the CPU 2 controls the control signal generator 25 to issue the write enable signal WE or the output enable signal OE. Then, the CPU 2 releases buses, issues the bus right authorization signal BACK, and stops its own access operation to the memory 3.

Upon receiving the bus right authorization signal BACK, the external unit directly accesses the memory 3. After writing or reading data to or from the memory 3, the external unit negates the bus right request signal BREQ, and the CPU 2 resumes operation. The external unit issues a memory access end instruction to execute an end process. In response to the instruction, the CPU 2 controls the control signal generator 25 to negate the write enable signal WE or the output enable signal OE. Data transfer between the external unit and the CPU 2 is achieved through the address bus 4 and data bus 5, and if necessary, an I/O control circuit is arranged to control the data transfer.

In this case, the password is stored in a password register 25a which is also rewritable after confirming the input of the previous password. For example, smart cards are manufactured with a common password of "00000000", which is expected to be rewritten respectively by users.

In summary, the present invention provides a microcomputer that restricts external accesses to an internal memory, to protect data stored in the memory.

Various modifications will become possible for those skilled in the art after receiving the teachings of the present disclosure without departing from the scope thereof.

What is claimed is:

1. A computer comprising:
   a memory having at least one port shared by an external device and an internal device and having a protected area where an access from the external device is prohibited;
   a CPU configured to control a bus right for access to address and data buses running between the CPU and the memory by devices internal and external to said computer; and
   a control circuit, comprising a read-protect register and a write-protect register configured to hold a protected address corresponding to the protected area in the memory, and configured to compare the protected address with a target address of an external device memory read or write access and to disable said external device memory read or write access if the target address corresponds to the protected address.

2. The computer of claim 1, wherein the protected area comprises:
an area to store at least one of programs and specific data.

3. A computer comprising:
a CPU;
a memory accessible from the CPU and a device external to said computer via a common port and including a read-protected area which is protected from being accessed by the external device;
an address bus configured to transfer an address from one of the CPU and the external device;
a data bus configured to transfer data between the memory and one of the CPU and the external device;
a signal line configured to transfer a read control signal from one of the CPU and the external device when reading data from the memory;
a signal line configured to transfer a write control signal from one of the CPU and the external device when writing data to the memory;
an input/output buffer configured to control data input/output between the data bus and the external device in response to an output enable signal;
an address decoder configured to enable the memory upon receiving an address from the address bus;
a gate configured to set the memory to a write enabled state in response to the write control signal and a write enable signal;
an output control circuit including a read-protect register and configured to generate the output enable signal and supply the output enable signal to the input/output buffer; and
a write control circuit including a write-protect resister and configured to generate the write enable signal and supply the write enable signal to the gate.

4. A computer comprising:
a CPU;
a memory accessible from the CPU and a device external to said computer via a common port and including a read-protected area which is protected from being accessed by the external device;
an address bus configured to transfer an address from one of the CPU and the external device;
a data bus configured to transfer data between the memory and one of the CPU and the external device;
a signal line configured to transfer a read control signal from one of the CPU and the external device to the memory when reading data from the memory;
an input/output buffer configured to control data input/output between the data bus and the external in response to an output enable signal; and
an output control circuit including a read-protect register and configured to generate the output enable signal and supply the output enable signal to the input/output buffer to protect the read-protected area of the memory from being accessed by the external device.

5. The computer of claim 4, wherein the read protect register is configured to hold data configured to specify the read-protected area in the memory where read access from the external device is prohibited.

6. The computer of claim 5, wherein the output control circuit is configured to issue the output enable signal if the CPU has a bus right and use the bus right to carry out a write access to the memory or if the external device has the bus right and uses the bus right to carry out a read access to an address of the memory that is out of the read-protected area.

7. The computer of claim 6, wherein the output control circuit comprises:
a comparator configured to determine whether or not an accessed address is in the read-protected area.

8. A computer comprising:
a CPU;
a memory accessible from the CPU and a device external to said computer via a common port and including a read-protected area which is protected from being accessed by the external device;
an address bus configured to transfer an address from one of the CPU and the external device;
a data bus configured to transfer data between the memory and one of the CPU and the external device;
a signal line configured to transfer a write control signal from one of the CPU and the external device to the memory when writing data to the memory;
a gate configured to set the memory to a write enabled state according to an AND of the write control signal and a write enable signal; and
a write control circuit having a write-control register and configured to generate the write enable signal and supply the write enable signal to the gate to restrict access to protect the read-protected area of the memory from being accessed by the external device.

9. The computer of claim 8, wherein the write protect register is configured to hold data specifying write-protected areas in the memory where a write access from the outside is prohibited.

10. The computer of claim 9, wherein the write control circuit is configured to issue the write enable signal if the external device has a bus right and uses the bus right to carry out a write access to an address of the memory that is out of the write-protected areas.

11. The computer of claim 10, wherein the write control circuit comprises:
a comparator configured to determine whether or not an accessed address is in the write-protected areas.

12. An information processing system comprising:
a microcomputer having a memory accessible by an external device;
a CPU configured to control a bus right that authorizes the use of address and data buses running between the CPU and the memory by receiving a bus right request from the external device and, if the request is acceptable, providing the external device with the bus right to a common port;
a register, comprising at least one of a read-protect resister and a write-protect register, and configured to hold a protected address that represents a protected area in the memory where an access from the external device is prohibited;
a control circuit configured to compare the protected address with a target address of a read or write access made from the external device to the memory after the bus right is given to the external device, and if the target address is within the protected addresses, disabling the read or write access; and
an external bus master unit configured to issue the bus right request to the CPU, receive a bus right authorization from the CPU if the request is accepted by the CPU, and access the memory through the address and data buses according to the bus right authorization.

13. The information processing system of claim 12, further comprising:

an external memory that is accessible from the CPU and the external bus master unit.

14. The information processing system of claim 13, wherein the microcomputer is fabricated in a single chip, and the external bus master unit and external memory are fabricated in another single chip.

15. A microcomputer comprising:

an address bus having an external terminal;

a data bus having an external terminal;

a control bus having an external terminal;

a bus right request signal line having an external terminal;

a bus right authorization signal line having an external terminal;

a CPU connected to the address bus, data bus, and control bus, said CPU configured to release a bus right after accepting a bus right request from an external device;

a memory connected to the CPU and an external device through the address bus, the data bus, and the control buss where a write access to the memory is enabled in response to a write enable signal;

means for storing data specifying a protected area in the memory where an access is prohibited; and a controller configured to monitor an address in the address bus while a bus right authorization signal is active in a bus right authorization signal line and prohibiting an access to the memory if the access is made to the protected area of the memory in response to the bus right request from the external device.

* * * * *